US010769370B2

(12) United States Patent
Zhu et al.

(10) Patent No.: US 10,769,370 B2
(45) Date of Patent: Sep. 8, 2020

(54) METHODS AND APPARATUS FOR SPELL CHECKING

(71) Applicants: ZHUHAI KINGSOFT OFFICE SOFTWARE CO., LTD, Guangdong (CN); BEIJING KINGSOFT OFFICE SOFTWARE CO., LTD, Beijing (CN)

(72) Inventors: Junhang Zhu, Guangdong (CN); Shicong Yan, Guangdong (CN)

(73) Assignee: Beijing Kingsoft Office Software, Inc., Beijing (CN)

( * ) Notice: Subject to any disclaimer, the term of this patent is extended or adjusted under 35 U.S.C. 154(b) by 41 days.

(21) Appl. No.: 15/132,865

(22) Filed: Apr. 19, 2016

(65) Prior Publication Data

US 2017/0293604 A1    Oct. 12, 2017

(30) Foreign Application Priority Data

Apr. 11, 2016  (CN) .......................... 2016 1 0224317

(51) Int. Cl.
| | |
|---|---|
| G06F 17/00 | (2019.01) |
| G06F 40/232 | (2020.01) |
| G06F 40/166 | (2020.01) |
| G06F 40/253 | (2020.01) |
| G06F 40/274 | (2020.01) |

(52) U.S. Cl.
CPC .......... *G06F 40/232* (2020.01); *G06F 40/166* (2020.01); *G06F 40/253* (2020.01); *G06F 40/274* (2020.01)

(58) Field of Classification Search
CPC .... G06F 17/273; G06F 17/276; G06F 40/232; G06F 40/166

USPC .................................................. 715/257, 256
See application file for complete search history.

(56) References Cited

U.S. PATENT DOCUMENTS

| | | | | |
|---|---|---|---|---|
| 5,649,222 A | * | 7/1997 | Mogilevsky | .......... G06F 17/273 715/257 |
| 5,907,680 A | * | 5/1999 | Nielsen | ............... G06F 16/9566 709/228 |
| 8,983,999 B2 | * | 3/2015 | Loofbourrow | .... G06F 16/90324 707/767 |
| 9,372,858 B1 | * | 6/2016 | Vagell | .................... G06F 17/274 |

(Continued)

FOREIGN PATENT DOCUMENTS

CN              105159872 A       12/2015

*Primary Examiner* — Stephen S Hong
*Assistant Examiner* — Matthew J Ludwig
(74) *Attorney, Agent, or Firm* — Wood Herron & Evans LLP

(57) ABSTRACT

The embodiments of the present application disclose a spell checking method and device, which relate to the technical field of computer software. The method includes: determining character segments corresponding to characters contained in a page to be displayed according to preset character segment dividing rules; obtaining the character locations of wrong words in each of the determined character segments; presenting each of the determined character segments and marking wrong words in the corresponding character segment in a form of preset mark according to the character locations of wrong words in each of character segments. The solutions provided by the embodiments of the present application are applied to improve document loading speed and document displaying speed, thereby improving users' experience.

34 Claims, 4 Drawing Sheets

(56) References Cited

U.S. PATENT DOCUMENTS

| | | | | |
|---|---|---|---|---|
| 9,881,010 B1* | 1/2018 | Gubin | ............... | G06F 17/30011 |
| 9,910,931 B2* | 3/2018 | Guerrero | ........... | G06F 16/90324 |
| 9,959,296 B1* | 5/2018 | Gubin | ................... | G06F 16/219 |
| 10,042,841 B2* | 8/2018 | Bute | ...................... | G06F 17/276 |
| 2002/0003898 A1* | 1/2002 | Wu | ......................... | G06F 40/53 |
| | | | | 382/187 |
| 2003/0097252 A1* | 5/2003 | Mackie | ................. | G06F 40/268 |
| | | | | 704/9 |
| 2004/0187084 A1* | 9/2004 | Berstis | ................. | G06F 17/241 |
| | | | | 715/259 |
| 2005/0149867 A1* | 7/2005 | Freelander | ............ | G06F 17/273 |
| | | | | 715/234 |
| 2006/0229995 A1* | 10/2006 | Ferraro | ................. | G06Q 20/383 |
| | | | | 705/74 |
| 2007/0005567 A1* | 1/2007 | Hermansen | ........ | G06F 16/90344 |
| 2007/0016625 A1* | 1/2007 | Berstis | .................. | G06F 17/241 |
| 2007/0162847 A1* | 7/2007 | Tunning | ................. | G06F 17/273 |
| | | | | 715/257 |
| 2009/0100335 A1* | 4/2009 | Garrison | ................ | G06F 40/232 |
| | | | | 715/257 |
| 2010/0104087 A1* | 4/2010 | Byrd | ................. | H04M 3/42221 |
| | | | | 379/265.09 |
| 2010/0286979 A1* | 11/2010 | Zangvil | .................... | G06F 40/40 |
| | | | | 704/9 |
| 2011/0246575 A1* | 10/2011 | Murayama | .............. | G06F 16/93 |
| | | | | 709/204 |
| 2013/0019169 A1* | 1/2013 | Bastide | ................. | G06F 40/232 |
| | | | | 715/257 |
| 2013/0060560 A1 | 3/2013 | Mahkovec et al. | | |
| 2013/0061139 A1* | 3/2013 | Mahkovec | ............ | G06F 17/273 |
| | | | | 715/257 |
| 2013/0283156 A1* | 10/2013 | Al Badrashiny | ..... | G06F 17/273 |
| | | | | 715/257 |

* cited by examiner

METHODS AND APPARATUS FOR SPELL CHECKING

CROSS-REFERENCE TO RELATED APPLICATION

This application claims the benefit of and priority to prior filed pending Chinese Application No. 201610224317.2, filed Apr. 11, 2016, which is expressly incorporated herein by reference.

TECHNICAL FIELD

The present application relates to the technical field of computer software, and particularly to methods and apparatus for spell checking.

BACKGROUND

With popularization of terminal devices such as computers, more and more users adopt an electronic office, which greatly facilitates the users' work. However, there are inevitable problems such as faulty input in a document to be browsed by a user. In order to facilitate the users' work, in the prior art, spell checking is performed on a whole document when a terminal device used by a user receives an instruction for opening the document and loads the document, and then presents prompt information for spelling mistakes to the user according to result of the spell checking. In this way, the user can intuitively know the spelling mistakes present in the document.

For example, the proofreading function of Microsoft WORD2013 is mentioned in the Chinese patent application No. 201510319466.2 entitled "text document spell and grammar checking method". For groups of writers, editors, secretaries and the like, the efficiency is relatively low when a relatively long text with such as more than 100 pages is edited and proofreaded, since the document is needed to be checked page by page so as to avoid omitting the identified spelling and grammar mistakes. In the technical solution of that application, It is also mentioned that: a system automatically compares the whole content of a text document with the content of a dictionary unit and marks spelling and grammar mistakes; meanwhile a marking and sorting unit marks and numbers the "lines" that contains spelling and grammar mistakes, and all the "lines" that contains the spelling and grammar mistakes are arranged and displayed by the system; the user processes the spelling and grammar mistakes on a document processing interface, and selects a text document sort recovering option after processing for the spelling and grammar mistakes; and the original "line" is replaced with the processed "line" according to the previously described mark and re-typeset by the marking and sorting unit. This method also spell-check the whole document and its efficiency is still very low.

In the practical applications, although results of spell checking can be obtained by applying the method described above, it is needed to perform spell-checking on the whole document during the loading of the document, which decelerates the speed in loading the document and thus the speed in displaying the document, thereby leading to a poor user experience.

SUMMARY

Embodiments of the present application disclose a spell checking method and device for improving the document loading speed and document displaying speed and thus improving users' experience.

To achieve the objective described above, an embodiment of the present application discloses a method for spell checking, which is applied to a client and includes:

determining character segments corresponding to characters contained in a page to be presented, according to a preset character segment dividing rule;

obtaining character locations of wrong words in each of the determined character segments; and presenting each of the determined character segments and marking, according to the character locations of the wrong words in each of the determined character segments, the wrong words in the corresponding character segment in a form of preset mark.

To achieve the objective described above, an embodiment of the present application discloses a method for spell checking, which is applied to a server and includes:

receiving character segments corresponding to characters contained in a page to be presented sent by a client, wherein, the character segments are obtained by dividing the page to be presented according to a preset character segment dividing rule by the client;

obtaining character locations of wrong words in each of the received character segments;

sending the character locations of the wrong words in each of the character segments to the client such that the client presents each of the character segments and mark wrong words in the corresponding character segment in a form of preset mark according to the character locations of the wrong words in each of the character segments.

To achieve the objective described above, an embodiment of the present application discloses an apparatus for spell checking, which is applied to a client and includes:

a character segment determining module for determining character segments corresponding to characters contained in a page to be presented according to a preset character segment dividing rule;

a character location obtaining module for obtaining character locations of wrong words in each of the determined character segments; and a wrong word marking module for presenting each of the determined character segments and marking, according to the character locations of the wrong words in each of the determined character segments, the wrong words in the corresponding character segment in a form of preset mark.

To achieve the objective described above, an embodiment of the present application discloses an apparatus for spell checking, which is applied to a server and includes:

a character segment receiving module for receiving character segments corresponding to characters contained in a page to be presented sent by a client, wherein, the character segments are obtained by dividing the page to be presented according to a preset character segment dividing rule by the client;

a character location obtaining module for obtaining character locations of wrong words in each of the received character segments; and a character location sending module for sending the character locations of the wrong words in each of the character segments to the client such that the client is able to present each of the character segments and mark wrong words in the corresponding character segment in a form of preset mark according to the character locations of the wrong words in each of the character segments.

It can be seen from above that for a page to be displayed in the embodiments of the present application, character locations of wrong words in character segments corresponding to characters contained in a page to be displayed and each of character segments is presented and according to the character locations of the wrong words in each character segment, the wrong words in the corresponding character segment are marked in a form of preset mark. As compared with the prior art, spell checking is performed for a page to be displayed before it is displayed in the solutions provided by the embodiments of the present application, the time taken by spell checking during the loading of a document is shorter than that taken by spell checking of the whole document during the loading of the document in the prior art, which can thus improve document loading speed and further improve document displaying speed, thereby improving user's experience.

BRIEF DESCRIPTION OF THE DRAWINGS

In order to describe the technical solutions in the embodiments of the present application or in prior art more clearly, appended drawings required for describing the embodiments of the present application or in prior art will be briefly described below. Obviously, the appended drawings described below are only some of embodiments of the present application, and those skilled in the art can obtain other drawings according to these drawings without doing creative works.

DETAILED DESCRIPTION

Figure 1:
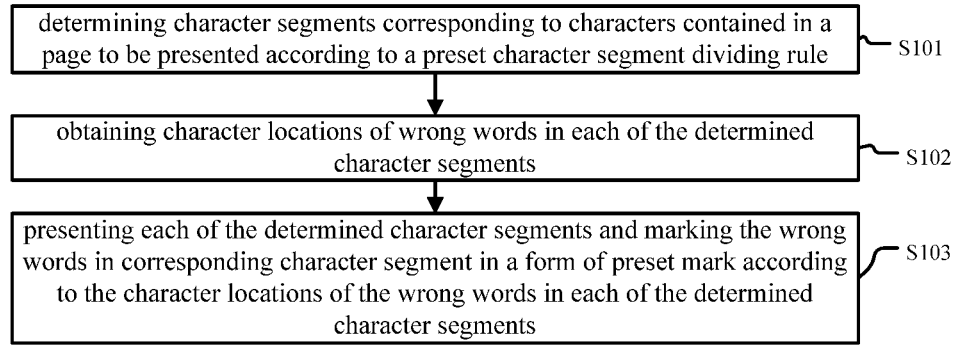
FIG. 1 is a schematic flowchart of a first method for spell checking provided by an embodiment of the present application.

Technical solutions in the embodiments of the present application will be described below clearly and completely in combination with the appended drawings of the embodiments of the present application. Obviously, the described embodiments are only some of the embodiments of the present application, rather than all of the embodiments. Any other embodiment obtained based on the embodiments of the present application by those skilled in the art without doing creative works falls into the protection scope of the present application.

Some concepts involved in the specific examples of the present application will be firstly introduced as follows:

A text stream system is a system consisting of mapping rules and data pools. The text stream technology solves the issues that location address information of all subsequent text is needed to be adjusted after deletion and addition of a text. The data pool is a general designation for all the text contents stored on a physical disk in a text stream system. The mapping rules a kind of index and relationship rule between physical locations and logical locations of data and can be represented by a tree structure, in which each text content corresponds to a physical address and a logical location address of that text content such that the computer can get access to the text content from the physical address. It should be noted that the mapping rule can also be a map structure, a chain structure, or a tree structure, and the application is not limited for this and preferably a tree structure.

An ErrorWordList list is a wrong-word list, which aims to record which word is wrong, for storing Range of wrong words without storage of materials. The starting location address of a wrong word is a logical location address rather than a physical address in the mapping rule described above.

An ValidRange List is a list that records Range of character segment on which the spell checking has been performed and that does not store materials. The creation of this list aims to improve the efficiency by avoiding repeatedly processing of the processed wrong words. The specific implementation is to determine the Range of the character segment on which the spell checking has been performed and that is determined to be put into or not put into the ErrorWordList list, and these character segments are character segments that are not changed, and it is again needed to spell-check the changed character segments which will thus be deleted from the ValidRange list.

An Marks List is a list of wrong words that is needed to be marked, the list is used to store the Range of wrong words that are marked in a way of preset mark but not to store materials. This list is provided to complete drawing work by calling a Marks List.

An Errors List is a list that helps to implement a right-click menu and is used to store the Range of all possible wrong words of which the suggested words would be presented possibly in a right-click menu but not to store materials. Among these possible wrong words, one wrong word would be eventually adopted.

An Ignore List is a list of wrong words for which spell checking is ignorable, the list is used to store the Range of the wrong words for which spell checking is ignorable but not to store materials. The Ignore List records Range of wrong words that are required to be ignored due to the need of system settings of an application software (e.g., the deleted content in a revised function and the words in an annotation is not needed to be spell-checked by an application software any more); also possibly records Range of wrong words that are set to be ignored by a user according to the his/her requirement; and also possibly records Range of wrong words that are manually added and considered to be required to be ignored by a user.

A Range is related to a starting location address (gcp) and an interval length (ccp). A starting location address can be a logical location address that is numbered from the initial location of a whole text and obtained in sequence. A Range is not a physical address mentioned in the mapping rule of the text stream system described above. It should be noted that the Ranges stored in each of lists described above can be represented by the combination of a starting location address and an interval length, and also can be represented by the combination of a starting location and an end location. The present application is not limited for this and preferably uses the combination of a starting location address (gcp) and an interval length (ccp).

In particular, the starting location address described above can be understood as a starting location index, and the end location address can be understood as an end location index.

The spell checking method and device provided by the embodiments of the present application will be introduced below in detail.

FIG. 1 is a schematic flowchart of a first method for spell checking provided by an embodiment of the present application. The method is applied to a client and includes following steps.

S101: character segments corresponding to characters contained in a page to be presented are determined according to a preset character segment dividing rule.

One document or web page can correspond to one or more display pages. The spell checking would be performed on only one of these display pages in embodiments provided by the present invention and the spell checking on the other pages are all the same with this method.

The display page described above includes a plurality of characters which can be Chinese words, English characters, French characters, German characters and the like, the present invention is not limited for this.

For example, a Chinese word can be understood as a single Chinese character such as "我", "你", "她".

An English character can be understood as an English letter or an English word, such as "a", "we", "you".

Moreover, the characters can also include punctuation symbols and numbers such as ",", ";", "1", "5", "10" no matter which character it is.

The character segment described above can be simply understood as a segment formed by one or more characters.

For example, one character segment can be: "解决了添加和删除", "解决了，添加和删除 . . .", "解决了，添加和删除 1, 2, 3", "Pay attention to your spelling", "Pay attention to your spelling!", "Pay attention to your spelling, 1, 2, 3" and the like.

In particular, the step of determining character segments corresponding to characters contained in a page to be presented according to a preset character segment dividing rule can be performed by the following steps: obtaining a character segment according to the preset character segment dividing rule and then performing the subsequent operations for this character segment such as spell-checking and presentation, and after complete of the processing for the character segment, obtaining the next character segment according to the preset character segment dividing rule and performing the same subsequent steps as those described above, and repeating in this way until the processing of the last character segment of the page to be presented completes.

In particular, with the increasing improvement of the performance of a user terminal device, most devices support multi-task parallel processing, and in view of this, the step of determining character segments corresponding to characters contained in a page to be presented according to the preset character segment dividing rule can also be performed by the following steps: obtaining a plurality of character segments at one time according to the preset character segment dividing rule and then performing the subsequent operations for a plurality of obtained character segments described above and repeating in this way until the processing of the last character segment of the page to be presented completes.

The preset character segment dividing rule described above can correspond to a plurality of instances particularly as follows:

In the first instance, all characters contained in a page to be presented are determined as one character segment, such that the presenting of the whole page to be presented can be completed during presenting of one character segment;

For example, it is assumed that all characters contained in a page to be presented are "all characters contained in a page to be presented are determined as a character segment", then the page to be displayed corresponds to only one character segment whose content is "all characters contained in a page to be presented are determined as a character segment".

In the second instance, in presenting a page to be presented, characters contained in a line to be presented are determined as one character segment, such that the presenting of only one line of the page to be displayed can be completed during presenting of one character segment;

For example, in presenting a page to be presented, characters contained in the first line to be presented are "The first instance is:", characters contained in the second line to be presented is "The second instance is:" and characters contained in the third line to be presented is "The third instance is:", then the page to be presented corresponds to three character segments whose contents respectively are "The first instance is:", "The second instance is:" and "The third instance is:".

In the third instance, characters contained in a page to be presented are divided into character segments according to a preset character length, and only a part of zone in the page to be presented is presented in presenting of one character segment, e.g., the preset character length can be 90 and the like.

For example, it is assumed that the content of a character segment of a page to be presented is " '解决了添加和删除文字带来的所有位 置都需要调整的问题' " and the preset length is 5, then the character segments corresponding to the page to be presented are "解决了添加", " 和删除文字", " 带来的所有", " 位置都需要", " 调整的问题".

In the fourth instance, after a character segment corresponding to characters contained in a page to be presented is obtained according to a preset character length, it is checked whether the character at the end of this character segment constitutes a word together with several characters at the beginning of the next character segment, and then the obtained character segment is adjusted according to the checking result. In this way, only a part of zone in the page to be presented is presented in presenting of one character segment.

For example, it is assumed that the content of a character segment of a page to be presented is "解决了添加和删除文字带来的所有位 置都需要调整的问题", then a character segment obtained according to a preset character length is " 解决了添加和删", the last character of this character segment is "删", and the first character at the beginning of the next character segment is "除", and obviously "删除" is a word. Thus the character segment described above is adjusted as " 解决了添加和删除" and can also be adjusted as "解决了添加和".

It should be noted that the present application is only described above by way of an example and the preset character segment dividing rule in a practical application is not merely limited to the above instances.

In an alternative implementation of the present application, characters contained in a page to be presented described above can be obtained from a text stream system and of course can also be obtained from other word storage systems, to which the present application is not limited.

S102: character locations of wrong words in each of the determined character segments are obtained.

The character locations of wrong words in a character segment can be obtained by means of a word library. In particular, taking one character segment for example, words corresponding to a character segment can be obtained firstly by performing word segmentation on the character segment, wrong words in the character segment can be determined by checking words corresponding to the character segment using a preset word library and then the character locations of the wrong words in the character segment can be further obtained.

Wherein, in word segmenting on the character segment described above, a tokenizer can be used for word segmentation on the character segment described above. The specific algorithms used by the tokenizer can be obtained from the prior art by a person skilled in the art and will not be described in detail here anymore.

It can be known from the above description that a page to be presented may include characters corresponding to several languages and the "word" described above is introduced here by an example of Chinese and English.

The "word" in Chinese can be understood as a minimum language unit that can be used independently in Chinese, which can be constituted by a Chinese character and also can be constituted by a plurality of Chinese characters, such as "我", "删除", "实施例" and the like.

The "word" in English can be understood as a minimum language unit that can be used independently in English, which can be constituted by an English character and also can be constituted by a plurality of English characters, such as "a", "we", "happen" and "take place" and the like.

It should be noted that the characters in a character segment may contain punctuation symbols, numbers and the like no matter which language these characters correspond to. In using the tokenizer for word segmentation, punctuation symbols, numbers etc. are also separated such that the punctuation symbols, numbers obtained by separation can also be called words corresponding to a word segment.

The preset word library described above can be a default word dictionary of a client, a third-party word library installed by a user, or a custom word library generated by a user adding words according to his/her usage habit.

In the determination of wrong words by detecting words corresponding to a character segment using a preset word library, if a word corresponding to a character segment can be detected using the preset word library, such a word is considered as a right word; otherwise, this word can be considered as an incorrect word, i.e., a wrong word.

In particular, character location of the wrong word described above can be represented in a form of a combination of a starting location address and a character length of the wrong word, and can also be represented in a form of a combination of a starting location address and an end location address of the wrong word, to which the present application is not limited.

S103: each of the determined character segments are presented and the wrong words in the corresponding character segment are marked in a form of preset mark according to the character locations of the wrong words in each of the determined character segments.

The above form of preset mark can be "a wave line underline", "a double underline", and can be in form of bold, and the present application is not limited to the specific implementation form.

A person skilled in the art can understand that a user may repeatedly browse the browsed content during the browsing of a document or a web page. Since the content of a display page has been spell-checked when a user browses the page at the first time, in order to ensure that spell checking is not repeatedly performed and page displaying speed is not influenced in case of repeatedly browsing the page, in a preferable implementation of the present application, it is possible to cache the character locations of wrong words in each of the determined character segments after being obtained.

In particular, the character locations described above can be cached in a list, e.g., cached in the ErrorWordList list described above.

Figure 2:
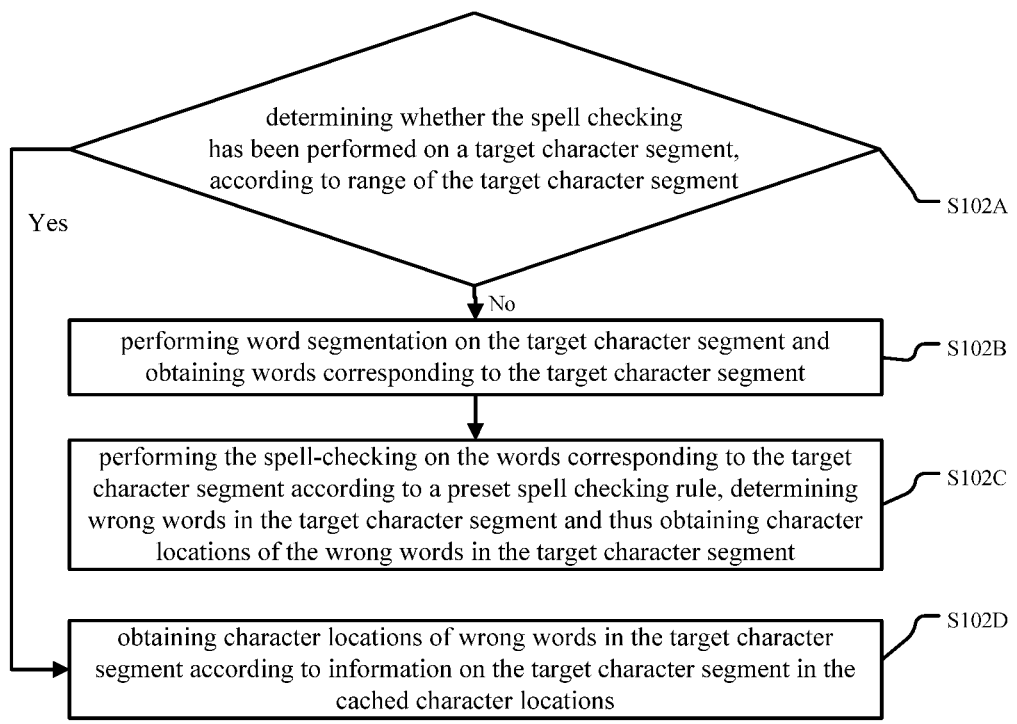
FIG. 2 is a schematic flowchart of a method for obtaining character locations of wrong words in character segments provided by an embodiment of the present application.

In obtaining the character locations of wrong words in each of the determined character segments, the character locations of wrong words in each of the character segments can be obtained according to some rules. In a specific implementation of the present invention, as shown in FIG. 2, a schematic flowchart of a method for obtaining character locations of wrong words in character segments is provided, and the method includes the following steps.

S102A: it is determined whether the spell checking has been performed on a target character segment, according to range of the target character segment, if yes, S102B is performed, otherwise S102D is performed.

Wherein, the target character segment described above is any one of the determined character segments.

The Range of the target character segment described above can be represented by a combination of a starting location address and a character length, and can also be represented by a combination of a starting address location and an end address location. In combination of the definitions given before, the range of the target character segment can be understood as the Range of the target character segment.

In a specific implementation of the present invention, range of a character segment that has been spell-checked can be recorded, for example, can be recorded in the ValidRange List described above. When it is determined whether a target character segment has been spell-checked according to the range of the target character segment, all that is required is to check whether the range of the target character segment is recorded in the ValidRange List described above; if this range is recorded, it is considered that the target character segment has been spell-checked, otherwise it is considered that the target character segment is not spell-checked.

S102B: word segmentation is performed on the target character segment and words corresponding to the target character segment are obtained.

For example, it is assumed that a target character segment is "解决了添加和删除", words corresponding to the target character segment obtained by performing word segmentation on the target character segment can include: "解决", "了", "添加", "和", "删除".

It is assumed that a target character segment is "Pay attention to your spelling", words corresponding to the target character segment obtained by performing word segmentation on the target character segment can include: "Pay", "attention", "to", "your", "spelling".

It can be understood that the target character segment may include punctuation symbols, characters that are set to be not required to participate in the word segmentation by a user according to practical needs. In view of this, in order to ensure to obtain words corresponding to the target character segment, in a specific implementation of the present application, it is possible to perform word segmentation on the target character segment firstly, and then filter the results of word segmentation according to a preset word filtering rule and obtain words corresponding to the target character segment according to the filtered results.

It is assumed that a target character segment is "S102B: 对目标字符段进行分词处理,", words obtained after performing the word segmentation on the target character segment are "S", "102", "B", ":", "对", "目标", "字符段", "进行", "分词", "处理", ",", and the preset word filtering rule specifies that capital letters, numbers and punctuation symbols is filtered, then the words corresponding to the target character segment are "对", "目标", "字符段", "进行", "分词", "处理".

Similarly to the above, in another implementation of the present application, words corresponding to a target character segment can be obtained by firstly filtering characters in the target character segment that satisfies the preset character filtering rule and then performing word segmentation on the filtered target character segment.

It is assume that a target character segment is "S102B: 对目标字符段: 进行分词处理,", the preset character filtering rule specifies that capital letters, numbers and punctuation symbols is filtered, then the filtered target character segment is "对目标字符 段进行分词处 理", and words corresponding to the target character segment obtained by performing word segmentation on the filtered target character segment are "对", "目标", "字符段", "进行", "分词", "处理".

S102C: the spell-checking is performed on the words corresponding to the target character segment according to a preset spell checking rule, wrong words in the target character segment are determined and thus character locations of the wrong words in the target character segment are obtained.

It can be understood that some words in a character segment is ignorable and only parts of words thereof are spell-checked during spell checking, for example, websites, numbers, words mixed with numbers and letters, words constituted by caption characters and the like is ignorable.

In view of above, in an alternative implementation of the present application, the step of performing the spell-checking on the words corresponding to a target character segment according to the preset spell checking rule, determining wrong words in the target character segment and thus obtaining the character locations of the wrong words in the target character segment can be performed by the following steps: firstly performing spell checking on words corresponding to the target character segment according to a preset word library so as to obtain wrong words in the target character segment, and then determining, as the character locations of the wrong words in the target character segment, character locations of wrong words in the wrong words of the target character segment for which spell checking is not ignorable.

In another alternative implementation of the present application, it is also possible to determine words in words corresponding to a target character segment for which spell checking is not ignorable and then perform spell-check on the determined words and obtain wrong words and thus obtain character locations of the wrong words in the target character segment.

S102D: character locations of wrong words in the target character segment are obtained according to information on the target character segment in the cached character locations.

Since the character location of the wrong word in a character segment can also be cached after obtaining the character location of the wrong word, and then if the target character segment has been spell-checked, the cached character location of the wrong word may include related information such as character location of the wrong word in the target character segment. In view of this, in an optional implementation of the present application, the step of obtaining character locations of wrong words in the target character segment according to information on the target character segment in the cached character locations can be performed by obtaining wrong words in the target character segment according to the information on the target character segment in the cached character locations and determining character locations of wrong words in the wrong words of the target character segment for which the spell checking is not ignorable as the character locations of the wrong words in the target character segment.

It is noted that, when the character location of the wrong word is cached after obtaining the character location of the wrong word in a character segment, only character locations of wrong words for which spell checking is not ignorable can be cached. In this case, after obtaining the wrong word in the target character segment, the obtained character location of a wrong word can be directly determined as the character location of a wrong word in a target character segment according to the information on the target character segment in the cached character location.

It can be seen from above that, in the present embodiment, for a page to be presented character locations of wrong words in character segments corresponding to characters contained in the page to be presented are obtained and each of the character segment is presented and wrong words in the corresponding character segment are marked in a form of preset mark according to the character locations of wrong words in each of the character segments. As compared with the prior art, the spell checking is performed on a page to be presented before the page is presented in the solutions provided by the present embodiment, the time taken by spell checking during the loading of a document is shorter than that by spell checking of a whole document during the loading of a document in the prior art, which can thus improve document loading speed and further improve document displaying speed, thereby improving user's experience.

The embodiments corresponding to FIGS. 1 and 2 will be further described in combination with a text stream system and each of lists described above.

The page to be presented is provided by a text stream system and one character segment corresponds to a line of the page to be presented.

It is assumed that the range of character in the first line of a page to be presented obtained from the text stream system is 0 to 90, it is determined whether this range is present in a ValidRange List, if this range is found, range of all wrong words within the range described above is obtained from an ErrorWordList list and wrong words that do not belong to an Ignore List among these wrong words are added to a Marks List.

If the range described above is not found in the ValidRange List, a text content (i.e., a character segment) corresponding to the above range is obtained from the text stream system, processing of word segmentation is performed on the text content described above and the spell-checking is performed as follows each time a word is obtained until the spell checking for the last word in the text content described above completes:

it is determined whether the obtained word is present in a preset word library, if not, this word is considered as a wrong word, then it is determined whether this word belongs to an Ignore List, and if not, this word is added to a Marks List;

the spell checking for content of the first line of text content on the page to be presented completes so far, and the text content and marking words in the Marks List described above is presented by wave lines;

the process described above is repeated until presentation of all the lines on a page to be presented completes.

It should be noted that the content in a Marks list can be emptied after words in this List are marked by wave lines in order to prevent the impact on marking of the subsequent words.

It can be known from the previous description that wrong words in character segments can be determined according to a preset word library. In a practical application, in order to ensure the accurate usage of the preset word library, it is possible to initialize the related information of a word library specifically as follows when the word library is used at the first time.

A path of a main word library corresponding to the currently used language and a path of a default custom word library are obtained, and a path of word library recorded in a registry is obtained by scanning a user registry; the main.dic file, main.aff file is found in each path according to information on the obtained path of word library, and then identifications corresponding to each word library is generated according to the above-mentioned files and the generated identifications and related information of word libraries is added to a preset word library list; and when a word library is needed subsequently to perform a misspell checking, which word library is needed to be used is found from the preset word library list according to the identifications of word libraries and the spell checking is performed by the word library found.

Figure 3:
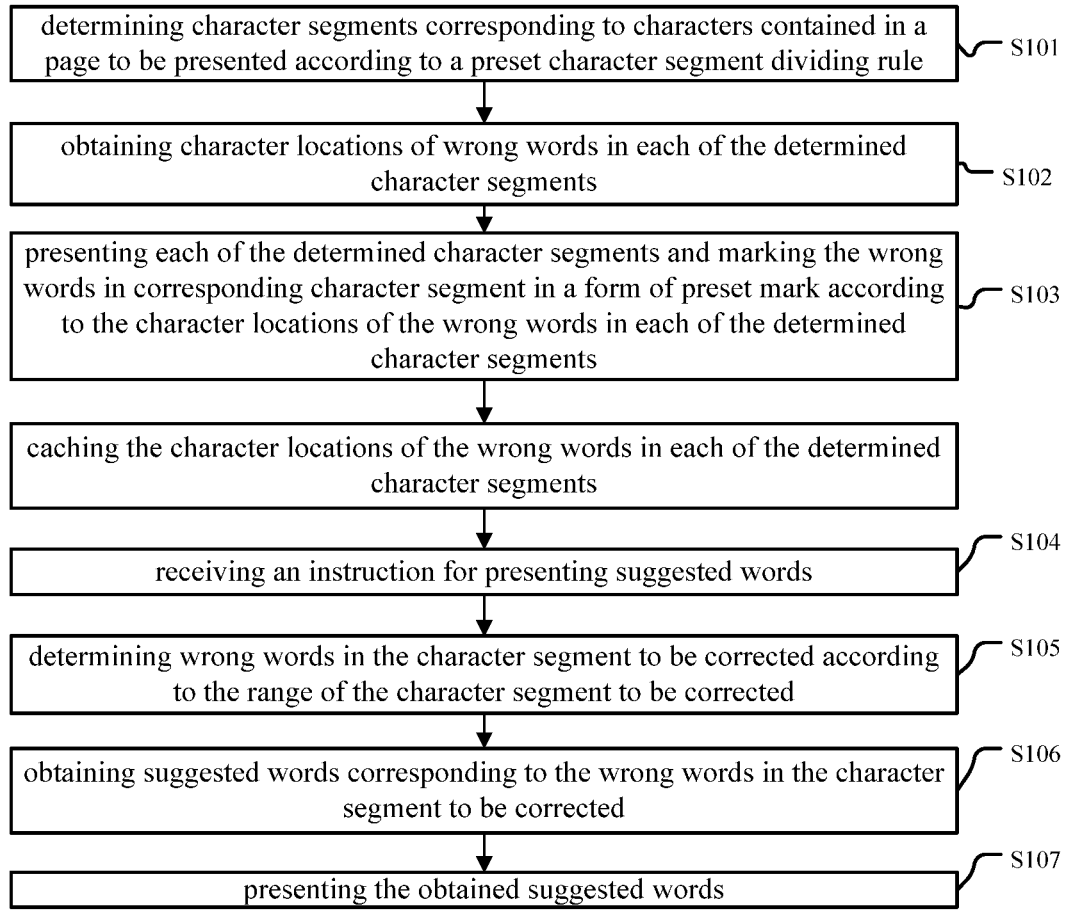
FIG. 3 is a schematic flowchart of a second method for spell checking provided by an embodiment of the present application.

In a specific implementation of the present application as shown in FIG. 3, which provides a schematic flowchart of the second spell checking method, as compared to the previous embodiment, the method spell checking described above in this embodiment also includes:

S104: an instruction for presenting suggested words is received.

Wherein, range of a character segment to be corrected is carried in the instruction for presenting suggested words, and range of the character segment to be corrected can be represented by a combination of a starting location address and character length of the character segment to be corrected and can also be represented by a combination of a starting location address and an end location of the character segment to be corrected, the present application is not limited to this.

In particular, the instruction for presenting the suggested words described above can be obtained by right clicking a mouse on a wrong word marked in a form of preset mark by a user, can also be obtained by right clicking a mouse after a word is selected by a user, can also be obtained by clicking a preset button after a cursor is adjusted within scope of a wrong word marked in a form of preset mark by a user and can also be obtained by clicking a preset button after a word is selected by a user.

It should be noted that the above description is only several implementations for obtaining an instruction for presenting suggested word and the present application is not limited to this.

In an alternative implementation of the present application, the range of a character segment to be corrected can be obtained in the following manner:

after obtaining the location where a user right clicks a mouse or the current location of a cursor, character locations of wrong words corresponding to the location is obtained by matching in a cached character location of wrong words according to the obtained locations, and the obtained character locations is determined as the range of a segment to be corrected.

In another alternative implementation of the present application, the range of a character segment to be corrected can also be obtained in the following manner:

the range of the selected word by a user is determined as the range of a character segment to be corrected described above.

S105: wrong words in the character segment to be corrected are determined according to the range of the character segment to be corrected.

In particular, the step of determining wrong words in the character segment to be corrected according to the range of the character segment to be corrected can be performed by matching the range of the character segment to be corrected with the cached character locations and determining wrong words in the character segment to be corrected according to the result of the matching.

The step of matching the range of the character segment to be corrected with the cached character locations can be performed by searching character locations within the range of a character segment to be corrected from the cached character locations and determining the found result as content of a matching result.

Since wrong words determined according to the matching result may include wrong words for which spell checking is ignorable, in the determination of wrong words within the character segment to be corrected according to the matching result, it is possible to determine wrong words in a character segment to be corrected according to wrong words in the matching result that is not ignorable.

It is noted that, wrong words in the character segment to be corrected described above can be one or more wrong words, to which the present application is not limited.

S106: suggested words corresponding to the wrong words in the character segment to be corrected are obtained.

The step of obtaining suggested words corresponding to wrong words can be performed by searching a word similar to this wrong word as a suggested word thereof through a preset word library, moreover, the words before and after the wrong word in a character segment can also be considered during the obtaining of the suggested words.

In particular, it is possible to cache character locations of the wrong words in the character segment to be corrected and the suggested words corresponding to the wrong words in the character segment to be corrected after the suggested words corresponding to the wrong words in the character segment to be corrected are obtained.

During the obtaining of suggested words corresponding to wrong words in a character segment to be corrected in case that the suggested words corresponding to the wrong words in the character segment are cached each time after being obtained, it is possible to determine whether the suggested words corresponding to the wrong words in the character segment to be corrected has been cached, according to the character locations of the wrong words in the character segment to be corrected, and if yes, the suggested words corresponding to the wrong words in the character segment to be corrected from the cached suggested words corresponding to the wrong words are obtained; otherwise, the suggested words corresponding to the wrong words in the character segment to be corrected according to a preset word library are obtained.

S107: the obtained suggested words are presented.

It can be known from description of S104 that the suggested word display instruction can be obtained by a plurality of methods. Thus, correspondingly during the displaying of the obtained suggested word, it is possible to display the obtained suggested word in the form of a right-click menu and also to display the obtained suggested word in the form of a single displaying block.

In an alternative implementation of the present application, after determining wrong words in the character segment to be corrected according to the range of the character segment to be corrected, it is also possible to determine whether the length of the wrong words in the character segment to be corrected is within a preset range; if so, S106 is performed, which can ensure that no suggested words are presented for a too long or too short character segment.

It can be seen from above that in a solution provided by an embodiment of the present application, a suggested word for a wrong word is presented after an instruction for presenting suggested words is received, which provides users with a further reminding information for eliminating wrong words, facilitates users to eliminate wrong words on a page to be presented and further improves users' experience.

The embodiments corresponding to FIG. 3 will be further described in combination with a text stream system and lists described above.

A user right-clicks a mouse on a wrong word marked by a wave line, and a starting location address and length of the wrong word are obtained from an ErrorWordList list according to the location where the user right-clicks the mouse, the range of this wrong word is added to an Errors List in case that the wrong word does not belong to an Ignore List. If it is monitored that the range of a wrong word in an Errors List is not empty, items in the right-click menu are set to include an operation item related to spell checking such as suggested words for the wrong word such that the right-click menu displayed subsequently includes an operation item related to spell checking. The wrong word is obtained from a text stream system according to the range of the wrong word in an Errors List, and the suggested words for the wrong word are obtained so as to generate a right-click menu which includes the suggested words for the wrong word described above.

Figure 4:
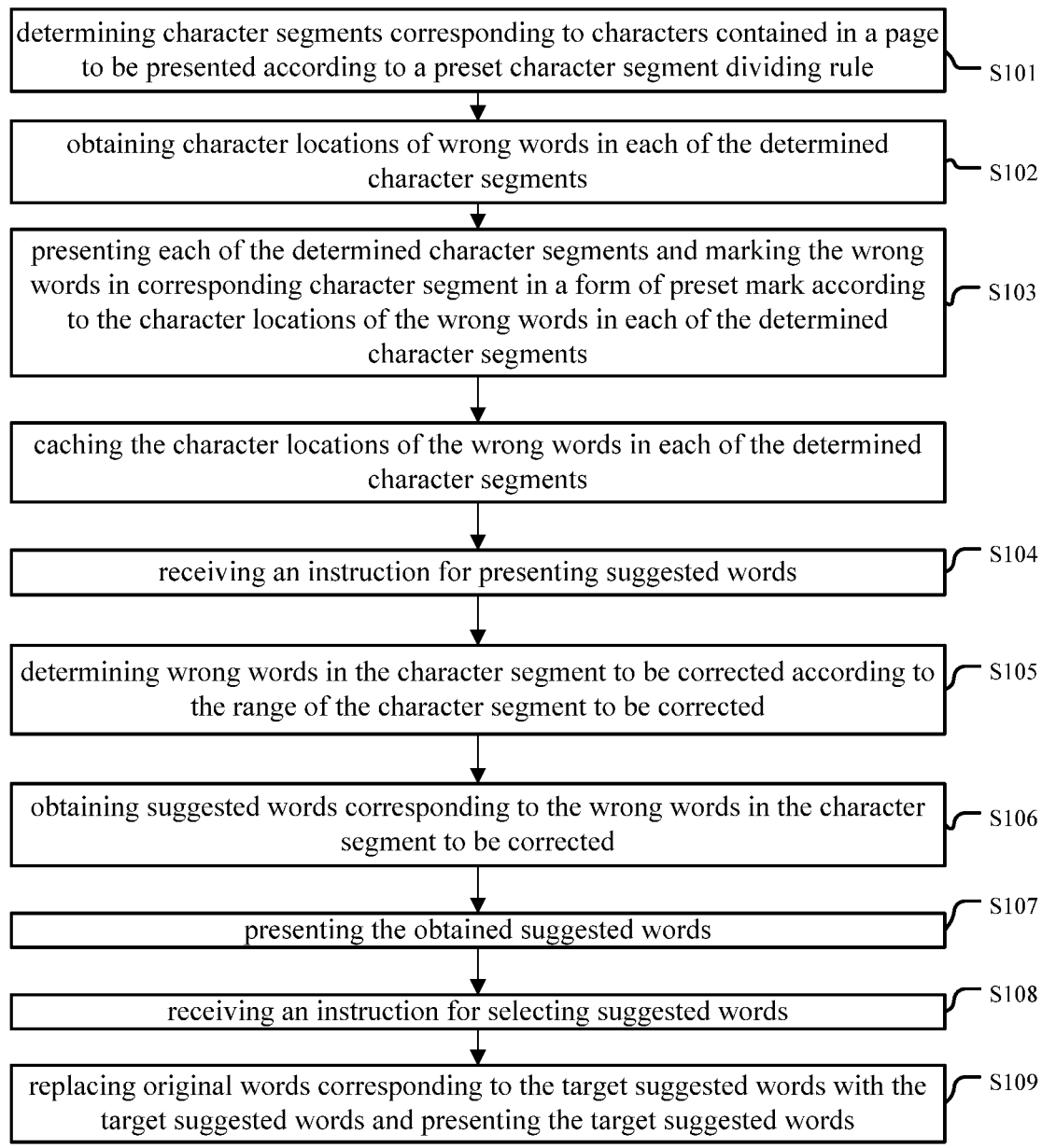
FIG. 4 is a schematic flowchart of a third method for spell checking provided by an embodiment of the present application.

In another specific implementation of the present application as shown in FIG. 4, which provides a schematic flowchart of the third method for spell checking, as compared to the embodiment as shown in FIG. 3, the method for spell checking described above in this embodiment also includes:

S108: receiving an instruction for selecting suggested words.

Wherein, target suggested words are carried in the instruction for selecting suggested words.

S109: original words corresponding to the target suggested words are replaced with the target suggested words and presenting the target suggested words.

The original words corresponding to a target suggested word described above is a wrong word in a character segment to be corrected.

It can be known from the previous description that it is possible to cache the character location of a wrong word in a character segment after the character location of a wrong word in a character segment is obtained, and the cached character location of a wrong word is not accurate any more after the replacement by a suggested word described above. Thus, in an alternative implementation of the present application, it is possible to update the cached information according to the original words corresponding to a target suggested word.

It can be understood that it is possible to edit the content on a page when the page is browsed by a user. In view of this, in a specific implementation of the present application, the spell checking method can also include:

obtaining the range of the modified character segment, obtaining the character location of a wrong word in a modified character segment, marking the wrong word in the modified character segment in a form of preset mark and updating the cached character location of the wrong word according to the range of the modified character segment and the character location of the wrong word in the modified character segment.

In particular, it is possible to firstly judge whether the range of a modified character segment is present in an ErrorWordList list after the range of the modified character segment is obtained, if so, delete the range described above from the ErrorWordList list, and then it is possible to determine whether any one of the following instances is present:

the first instance: the range of the modified character segment is present in a ValidRange List, this range is deleted from the ValidRange List in this case;

the second instance: ValidRange List contains a part of ranges or all the ranges of the modified character segment, the part related to the range of the modified character segment is deleted from the ValidRange List in this case.

The character location of a wrong word in a modified character segment is then obtained and marked according to the method previously described.

It can be seen from above that in the present embodiment, the replacement is carried out according to selected suggested word without the need of manually inputting substituted words by users, which facilitates the users' operation and further improves users' experience.

In order to release the work load of a client, spell checking can also be performed on a server side besides the client. In view of this, the present application also provides a spell checking method applied to a server.

Figure 5:
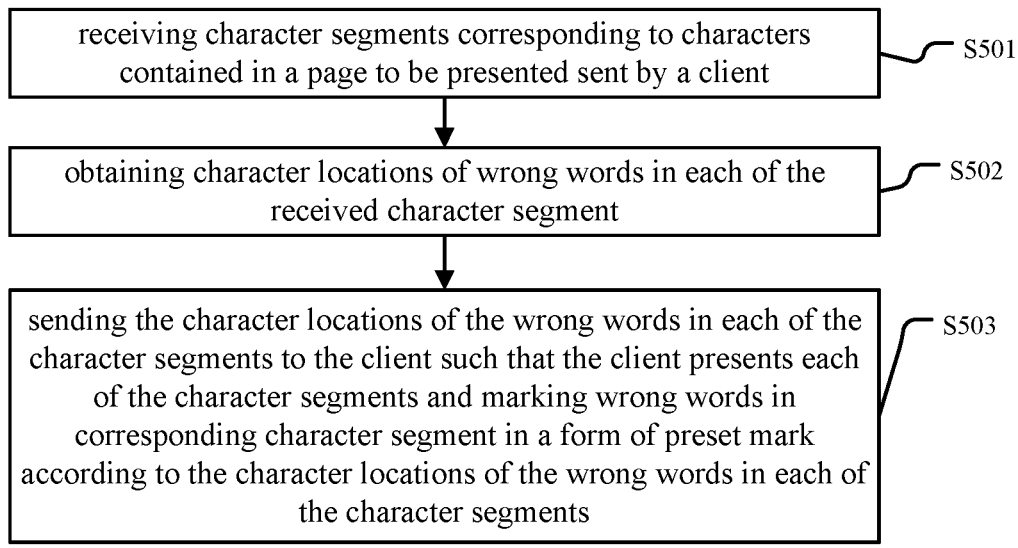
FIG. 5 is a schematic flowchart of a fourth method for spell checking provided by an embodiment of the present application.

In particular, refer to FIG. 5 that provides a schematic flowchart of the fourth method for spell checking, which includes:

S501: receiving character segments corresponding to characters contained in a page to be presented sent by a client.

Wherein, the character segments described above are obtained by dividing the page to be presented according to a preset character segment dividing rule by the client.

S502: character locations of wrong words in each of the received character segment are obtained.

S503: the character locations of the wrong words in each of the character segments are sent to the client such that the client presents each of the character segments and wrong words in the corresponding character segment are marked in a form of preset mark according to the character locations of the wrong words in each of the character segments.

In a specific implementation of the present application, the method for spell checking can also include:

receiving an instruction for presenting suggested words sent by the client, wherein, range of a character segment to be corrected is carried in the instruction for presenting suggested words; determining wrong words in the character segment to be corrected according to the range of the character segment to be corrected; obtaining suggested words corresponding to the wrong words in the character segment to be corrected; and sending the obtained suggested words to the client such that the client presents the obtained suggested words.

In another specific implementation of the present application, the method for spell checking can also include:

receiving an instruction for checking a modified character segment, wherein, range of the modified character segment is carried in the instruction for checking; obtaining character locations of wrong words in the modified character segment; and sending the character locations of the wrong words in the modified character segment to the client such that the client is able to mark the wrong words in the form of the preset mark according to the character locations of the wrong words in the modified character segment.

It should be noted that, the method for obtaining character locations of wrong words in each of the received character segments by a server can be the same with the method for obtaining character locations of wrong words in character segment by the client previously described and is not repeatedly described any more here.

It can be seen from the above that in the solution provided by the present embodiment, after character segments corresponding to a page to be displayed are obtained by a server, the character locations of wrong words in each of character segments are obtained based on the unit of a character segment and sent to a client. In this way it is not only possible to release the work load of a client, but also to shorten the time taken by spell checking during the loading of a document as compared to that spell checking is performed for the whole document in the prior art. Thus, it is also possible to improve document loading speed and document displaying speed, thereby improving users' experience.

In order to explain the spell checking method provided by an embodiment of the present application more clearly, the spell checking function is explained below taking the WPS word application software in WPS software as an example, but the following specific embodiments are not intended to limit the present application.

Some of the concepts previously introduced will be further introduced based on the concepts previously introduced in the embodiment as shown in FIG. 1.

A text stream system: a system consisting of mapping rules and data pools. In original linear storage technology, it is necessary to displace data following modified points during the insertion and deletion of a document, the efficiency problem caused by this is solved by text stream technology. Data pool is a dataset stored in an internal memory, the dataset stores all the actual text data in a text stream and each character has an unique physical address. The mapping rules are relationship rules between the physical locations and logical index of data and can be represented by a tree structure, the logical index of each text content corresponds to actual physical address of this text content such that the computer can inquire, according to a logical index location, actual physical address thereof and obtain actual text content from this physical address. It should be noted that the mapping rule can also be a map structure, a chain structure, or a tree structure, the application is not limited for this and preferably a tree structure.

ErrorWordList list: a wrong-word list for recording the range of all the wrong words within some range in a text stream. Range of a wrong word can be represented by its logical index in a text stream, such as [a starting location index, a interval length], and it is not related with an actual physical address, which applies to all the ranges mentioned below.

ValidRange List: a processed interval list, for recording range of text on which spell checking has been performed, the range recorded in this list ensures that all the wrong words within its range have been added to the ErrorWordList list. Usage of this list avoids a repeat spell checking for the text range and improves efficiency. When a text stream changes, e.g., when a user inputs or deletes a text, all the ranges in a ValidRange that include the changed zone can also update at the same time, and the zone for which spell checking needs to be carried out again will be truncated or deleted from the ValidRange List.

Marks List: a wrong-word list that needs to be marked and is used to store the Range of wrong words that are marked in a preset marking method. A system will draw preset marks (e.g., underline, wave line) for all the intervals stored in this list so as to remind users that words within these intervals are wrong.

Errors List: a list that helps to realize a right-click menu and is used to store the Range of all the possible wrong words that may display the suggested word in a right-click menu. Among these possible wrong words, one wrong word is eventually adopted.

Ignore List: a list of Range of wrong words that need to be ignored during the current spell checking. Range present in this list will be ignored and considered as correct words during the current running of software.

Range: a data structure that is constituted by a starting location index (gcp) and an interval length (ccp) and represents an interval. A starting location index can be a logical location index obtained successively by numbering from the initial location of the whole text stream. Range is not the physical address mentioned in the mapping rule of the text stream system described above. It should be noted that the Ranges stored in each of lists described above can be represented by the combination of a starting location address index and an interval length, and also can be represented by the combination of a starting location index and an end location, the present application is not limited for this and preferably uses the combination of a starting location index (gcp) and an interval length (ccp).

It should be noted that the starting location address mentioned below in various embodiments can be understood as a starting location index mentioned in the explanation of Range.

The process of spell checking using spell checking function of WPS word application software of WPS software is as follows:

Step 1: obtaining the starting location address (gcpA) of a modified text location when a change of a text stream system is detected.

Step 2: wrong words stored in this location in an ErrorWordList are invalid, the ranges including this gcp are found in the ErrorWordList according to this starting location address gcpA of the modified text location and then deleted. ErrorWordList will be updated in the subsequent steps.

Step 3: determining the line where gcpA locates, obtaining range of this line and each line following this line, obtaining the text content within the range of this line, carrying out word segmentation processing on this text content, screening the word segmentation processing result, deleting special symbols and obtaining each clean word.

Step 4: the clean word is compared with correct words in a word library so as to look up whether this clean word is present in the word dictionary each time after the clean word is obtained. If not present, this clean word is considered as a wrong word.

Step 5: putting Range of a wrong word to an ErrorWordList, and if this word should not be ignored, also putting it to a Marks List.

Step 6: Starting to draw each page, starting to draw each line of this page, obtaining each Range of a line successively when it is going to draw this line, and the location of this Range is drawn as wave line if this Range is in the Marks List.

As a specific implementation, spell checking is performed for the first line when drawing the first line, and spell checking is performed for second line when drawing the second line, which leads to a phrased task and improves efficiency.

Step 7: when a user right clicks and wishes to call out a right-click menu, obtaining a starting location address gcp of location where the user right clicks.

Step 8: obtaining Range of the wrong word from ErrorWordList an according to a starting location index gcp.

Step 9: obtaining text content of the wrong word according to Range of the wrong word, searching in a word library and obtaining a feasible list corresponding to the wrong word.

Step 10: loading the feasible list during the preparation of the right-click menu, and displayed to the user through an interface for view.

As a specific implementation, the suggested words for a wrong word are looked up and determined only during the request of a right-click menu, which improves work efficiency and display efficiency. In fact, the user modifies frequently, if all the functions of spell checking are performed in advance, many modified words that are reviewed and suggested have not been used yet before they are discarded.

The spell checking process described above will be introduced below by more detailed embodiments.

1. A Process of Drawing Marks, i.e., Marking a Wrong Word by a Red Wave Line.

A user inputted new contents or deleted or modified something, or moved a text to the other location so that data pools or mapping rules of a text stream system change. When a change of a text stream system is monitored, obtain the starting location address gcp of modified text location, then obtain the lines whose locations are modified, carry out word segmentation line by line and check whether each segmented word is a wrong word, if there are wrong words, putting these wrong words to a Mark List and then draw wrong words page by page and line by line in each page, e.g., adding wave lines for the wrong words. The detailed steps are as follows:

Step 1: obtaining the starting location address (gcpA) of a modified text location when a change of a text stream system is detected.

E.g., a user inputted new contents or deleted or modified something, or moved a text to the other location so that data pools or mapping rules of a text stream system change. Then it is time to start obtaining the starting location address of a text location and assume that value of the starting location address gcpA is 20.

Step 2: searching each Range in an ErrorWordList list according to the starting location address (gcpA) of the modified text location described above and determining whether the starting location address (gcpA) is within any one of Range intervals.

Assume value of one Range A in the ErrorWordList is [15,50], i.e., the starting location address (gcp B) of Range A is 15 and the interval length (gcpB) is 50, it is determined that gcpA is within the interval of Range A.

If the starting location address (gcpA) is within the interval of a certain Range, the starting location address (gcpA) becomes the value of the starting location address (gcpB) of this Range, i.e., value of gcpA becomes 15 from 20, and then delete this corresponding Range in the ErrorWordList list, i.e., delete Range A; If there are a plurality of Ranges whose gcpAs are found, carry out the such operations described above for these Ranges. If the starting location address (gcpA) is not within any one of Range intervals, it does not need to modify values of gcpA. The reason is that spell checking is needed again for the modified character segment. At this time records for this location in the ErrorWordList have been invalid and thus are deleted from the ErrorWordList list. If it is considered to be a wrong word after spell checking, just simply adding this to an ErrorWordList list again. The updating of gcpA to gcpB is to complete the operation of step 3, since if gcpA is within an interval of an ErrorWordList, it is demonstrated that this interval is a complete word, then the whole range where this word locates should be updated during the updating of ValidRange and thus the starting location gcpA is modified to gcpB, i.e., value of starting location of the word.

Step 3: searching whether there is a gcpA in each of Ranges in a ValidRange List, and if so, the Range is truncated from this location; otherwise, go to the next step.

Assume value of gcpA is 15, value of one Range B in the list is [0, 16], then it is determined that a gcpA is found in the ValidRange list and value of Range B is changed into [0, 15]. In this Range B in the ValidRange list, the small section of this Range B following this gcp A is discarded just like a gecko cuts away a part of its tail with the anterior section remained. If gcpA is found in a plurality of Ranges, such operation described above is carried out for all of these ranges.

Step 4: obtaining content of a line in a document and putting to a tokenizer so as to carry out word segmentation.

For example, the location address interval of the first line in a document is [0,90], then the text content of interval of [0,90] is obtained by a text stream system and word segmentation is carried out one by one. Go to the next step each time when one word is segmented and check whether this word is wrong; another one word is segmented again and sent to the next procedure. If a system is a parallel system, it is possible to process in parallel, and if a system is a serial system, continue to process the next segmented word after the processing on one segmented word completes.

The steps of word segmentation are as follows:

splitting out one Rang from the beginning of the current remaining content and obtaining text content within this Range from a text stream system by a tokenizer.

obtaining a clean word by screening this text content so as to delete special symbols, and executing step 5; wherein, the special symbols include symbols meaningless regarding spell checking such as spaces, question marks, a clean word is a formally and not semantically legal word, such as an English word or Chinese word.

Executing steps 5, 6, 7 in the current Range.

Repeating step 1 until the segmentation of each text content that is put to a tokenizer completes.

Step 5: the clean word is compared with correct words in a word library so as to look up whether this clean word is present in the word dictionary. If not present, it is considered to be wrong and execute step 6; otherwise, it is considered to be correct and return and execute step 4 described above again.

Step 6: putting the Range of the current wrong word to an ErrorWordList list.

Step 7: checking whether this wrong word should be ignored according to the configured Ignore option, such as whether the capital, words mixed with numbers and letters, websites and the like are ignored. If this wrong word needs to be ignored, ignore this wrong word and then return and execute step 4 again; otherwise, put Range of this wrong word to a Marks list.

Which words are wrong words that should be ignored? For example, ignore all the capitals, words mixed with numbers and letters, deleted contents in a revised function, newly-added contents, contents in an annotation, these words are not considered to be wrong words but words that have special meaning for which spell checking is not performed.

Word segmentation is a process of dividing the whole content of a section into many single words, when the word segmentation of the whole text of a line, the whole text of a paragraph, the whole text of a page or the whole text of the entire document completes, start the drawing work, draw words in a list by adding wave lines. Preferably, in order to improve the drawing speed, the whole text is drawn just after word segmentation of the whole text of a line completes. A further preferable solution is only to word-segment and draw the content that can be displayed by a monitor and not to draw contents that do not need to be displayed at first. Wrong words are marked by wave lines during the drawing.

Drawing Steps

Step 1: starting to draw the first page and executing step 2, and then starting to draw the second page and repeating until there are no pages to be drawn.

A page to be drawn can be a page displayed on a screen, a page that is not displayed on the screen currently is not drawn no more in the present specific embodiment.

Step 2: starting to draw a line of this page and executing step 3, and then starting to draw the second line and repeating until there are no lines to be drawn.

Step 3: successively obtaining each Range of this line.

Step 4: search in a ValidRange list whether each Range described above is present in the ValidRange list; if not, it can be proved that this Range has not been spell checked or content has been updated and needs to be spell-checked again, then put the current zone of a text stream system into a tokenizer to carry out word segmentation, carry out word segmentation step previously described so as to obtain segmented words, determine whether it is necessary to put them to a Marks list, and then execute step 6; Otherwise, execute step 5.

Step 5: extracting all the wrong words included within this Range from an ErrorWordList list.

Step 6: determining each wrong word of all the wrong words is present in an Ignore list. The Ignore list contains vocabularies that should be ignored according to the designation of users. If not present, it is demonstrated that this wrong word is not ignorable, then put Range of this wrong word to a Marks list.

Step 7: drawing on Range location in the Marks list by marks.

The Process of Preparing a Right-Click Menu

The following procedure will be triggered to prepare a right-click menu only when a user right clicks on a wrong word, and the suggested word for the wrong word will be found and displayed only during the preparation of a right-click menu.

Step 1: obtaining a starting index location (gap) and an interval length (ccp) of the location where a user right-clicks.

Step 2: searching, in an ErrorWordList list, all the wrong words included within this interval, and putting the wrong words to an Error List if they should not be ignored.

Step 3: if the Error list is not null, extracting Range of the first wrong word from this list.

The Error list may include a plurality of ranges of wrong words since a machine may denote words at this location as several possible wrong words. Wherein, steps 2 and 3 can be substituted by the following step: searching in the ErrorWordList list, obtaining the first wrong word found in this interval and then obtaining Range of this wrong word, this step is more effective than steps 2 and 3.

Step 4: checking and judging whether this Range should be ignored, such as whether it is a text in a revised state; if this range should not be ignored, go to step 5.

Step 5: loading spell checking setting sub-item when preparing a right-click setting menu.

During the preparation of a right-click menu, the system will load various menu sub-items, for example copy, paste etc. are in a menu item, fonts, paragraphs, etc. are in another sub-menu item, and a list of the correct words recommended to the user during spell checking are in a sub-menu item. If it is needed to load the spell checking sub-items, they are only obtained and loaded during the preparation of a right-click menu.

Step 6: displaying a right-click menu and generating right-click menu sub-items. The generation of right-click menu sub-items includes steps (1) to (4).

(1) obtaining range of a wrong word according to the click location by a user.

The way of obtaining range of a wrong word is to search each Range in an ErrorWordList list according to the starting location address (gcpC) of the modified text location, Range C including this gcpC will be found because there must be wrong words at this location due to the fact that this step has been arrived at.

(2): obtaining the text content of this Range from a text stream, judging whether the text content is larger or smaller than a preset threshold, and if so, discarding too long and too short text content and not executing the following steps; otherwise, continue the next step.

(3): if this text content has already included a feasible list in the cookie, directly using the feasible list to generate a menu item list which is displayed to users for viewing; if there is no cookie or this word is not present in cookie, go to the next step. A feasible list is a plurality of suggested correct words corresponding to this text content.

(4): obtaining a word library, searching the feasible list and recording the feasible list to cookie, generating a list of menu items and displaying it to users for viewing.

The Process of Substituting as Correct Words

The selection of a suggested word from a right-click menu by a user will trigger the following procedure. For example, a user is going to modify a wrong word "wod" to "word".

Step 1: obtaining the content which is selected by the user on a menu item, i.e., one text content "word".

Step 2: setting the selected zone as Range of the original wrong word, i.e., Range of "wod" is [5,3], location address 5 is and the length is 3.

Step 3: substituting the content of the selected zone with the suggested word, substituting the "wod" in a text stream system with "word", then range of word "word" will become [5,4].

Step 4: setting the location after the selected zone is substituted with the suggested word, i.e., placing the cursor location at the end of this word, i.e., following the end of this word.

5. The Process of Initiating a Word Library

When a user sets to enable spell checking function, the function related to spell checking needs to be initiated when it is to be used for the first time so as to prepare to create various dictionaries and system functions. The process of initiation can include the following three steps.

Step 1: obtaining main dictionary path of the current language and the default path of custom word library, scanning information related to a registry, searching whether there are other user-defined dictionary, if so, also obtaining related path information.

A custom word library is a system manually added by users or provided by a system itself or provided by an application software itself and the like.

Step 2: adding these two dictionaries (main dictionary and possibly a plurality of custom dictionaries) respectively;

These two kinds of dictionaries are added by creating dictionary information records and putting them to a list of dictionary managing module and the registry.

Step 3: loading these two kinds of dictionaries by a WPS application software.

Correspondingly to the method for spell checking described above, the embodiment of the present invention also provides an apparatus for spell checking.

Figure 6:
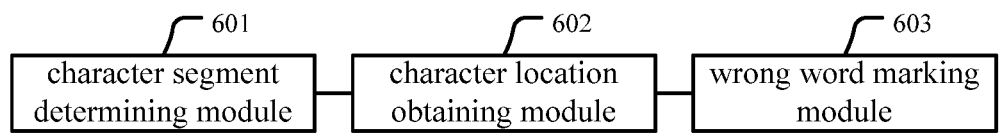
FIG. 6 is a schematic structural diagram of a first apparatus for spell checking provided by an embodiment of the present application.

FIG. 6 is a structural diagram of an apparatus for spell checking provided by an embodiment of the present application, the apparatus is applied to a client and includes:

a character segment determining module 601 for determining character segments corresponding to characters contained in a page to be presented according to a preset character segment dividing rule;

a character location obtaining module 602 for obtaining character locations of wrong words in each of the determined character segments; and a wrong word marking module 603 for presenting each of the determined character segments and marking, according to the character locations of the wrong words in each of the determined character segments, the wrong words in the corresponding character segment in a form of preset mark.

In particular, the apparatus for spell checking can also include:

a character location caching module for caching the character locations of the wrong words in each of the determined character segments after the character location obtaining module obtaining the character locations.

In particular, the character location obtaining module 602 can include:

a character segment determining submodule, for determining whether the spell checking has been performed on a target character segment, according to range of the target character segment, wherein the target character segment is any one of the determined character segments;

a word obtaining submodule for performing word segmentation on the target character segment and obtaining words corresponding to the target character segment in case that the determining result from the character segment determining submodule is negative;

a first character location obtaining submodule for performing the spell checking on the words corresponding to the target character segment according to a preset spell checking rule, determining wrong words in the target character segment and obtaining character locations of the wrong words in the target character segment;

a second character location obtaining submodule for obtaining character locations of wrong words in the target character segment according to information on the target character segment in the cached character locations in case that the determining result from the character segment determining submodule is positive.

In particular, the first character location obtaining submodule can include:

a first wrong word obtaining unit for performing the spell checking on the words corresponding to the target character segment according to a preset word library and obtaining wrong words in the target character segment; and a first character location determining unit for determining character locations of wrong words in the wrong words of the target character segment for which the spell checking is not ignorable as the character locations of the wrong words in the target character segment.

In particular, the second character location obtaining submodule can include:

a second wrong word obtaining unit for obtaining the wrong words in the target character segment according to the information on the target character segment in the cached character locations; and a second character location determining unit for determining character locations of wrong words in the wrong words of the target character segment for which the spell checking is not ignorable as the character locations of the wrong words in the target character segment.

In particular, the word obtaining submodule can include:

a word segmentation unit for performing the word segmentation on the target character segment;

a filtering unit for filtering the segmented words according to a preset word filtering rule; and a word obtaining unit for obtaining the words corresponding to the target character segment according to the filtered words.

In particular, the apparatus for spell checking can also include:

a presenting instruction receiving module for receiving an instruction for presenting suggested words, wherein, range of a character segment to be corrected is carried in the instruction for presenting suggested words;

a wrong word determining module for determining wrong words in the character segment to be corrected according to the range of the character segment to be corrected;

a suggested word obtaining module for obtaining suggested words corresponding to the wrong words in the character segment to be corrected; and a suggested word presenting module for presenting the obtained suggested words.

In particular, the wrong word determining module can include:

a range matching submodule for matching the range of the character segment to be corrected with the cached character locations; and a wrong word determining submodule for determining the wrong words in the character segment to be corrected according to the result of the matching.

In particular, the apparatus for spell checking can also include:

a suggested word caching module for caching character locations of the wrong words in the character segment to be corrected and the suggested words corresponding to the wrong words in the character segment to be corrected after the suggested word obtaining module obtaining the suggested words.

In particular, the suggested word obtaining module can include:

a suggested word determining submodule for determining whether the suggested words corresponding to the wrong words in the character segment to be corrected have been cached according to the character locations of the wrong words in the character segment to be corrected;

a first suggested word obtaining submodule for obtaining the suggested words corresponding to the wrong words in the character segment to be corrected from the cached suggested words corresponding to the wrong words in case that the determining result from the suggested word determining submodule is positive; and a second suggested word obtaining submodule for obtaining the suggested words corresponding to the wrong words in the character segment to be corrected according to a preset word library in case that the determining result from the suggested word determining submodule is negative;

In particular, the apparatus for spell checking can also include:

a length determining module for determining whether the length of the wrong words in the character segment to be corrected is within a preset range, and if so, triggering the suggested word obtaining module to obtain the suggested words.

In particular, the apparatus for spell checking can also include:

a selection instruction receiving module for receiving an instruction for selecting suggested words, wherein, target suggested words are carried in the instruction for selecting suggested words; and a word replacing module for replacing original words corresponding to the target suggested words with the target suggested words and presenting the target suggested words.

In particular, the apparatus for spell checking can also include:

a range obtaining module for obtaining range of a modified character segment;

the character location obtaining module is further used for obtaining character locations of wrong words in the modified character segment;

the wrong word marking module is further used for marking the wrong words in the modified character segment in a form of preset mark and updating the cached character locations of the wrong words according to the range of the modified character segment and the character locations of the wrong words in the modified character segment.

It can be seen from above that for a page to be displayed in the present embodiment, character location of the wrong word in character segment corresponding to characters contained in the page to be displayed and then each character segment is displayed and the wrong word in the corresponding character segment is marked in a form of preset mark according to the character location of the wrong word in each character segment. As compared with the prior art, spell checking is performed for a page to be displayed before it is displayed in the solutions provided by the present embodiment, the time taken by spell checking during the loading of a document is shorter than that by spell checking of the whole document during the loading of the document in the prior art, which can thus improve the loading speed of a document and further the displaying speed of a document and eventually user's experience.

Figure 7:
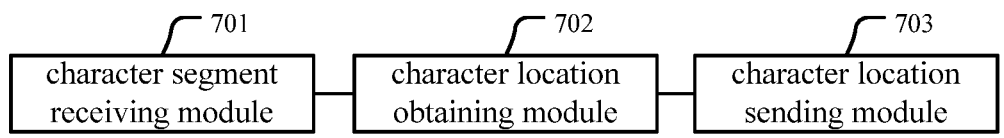
FIG. 7 is a schematic structural diagram of a second apparatus for spell checking provided by an embodiment of the present application.

FIG. 7 is a structural diagram of an apparatus for spell checking provided by an embodiment of the present application, the apparatus is applied to a server and includes:

a character segment receiving module 701 for receiving character segments corresponding to characters contained in a page to be presented sent by a client, wherein, the character segments are obtained by dividing the page to be presented according to a preset character segment dividing rule by the client;

a character location obtaining module 702 for obtaining character locations of wrong words in each of the received character segments; and a character location sending module 703 for sending the character locations of the wrong words in each of the character segments to the client such that the client is able to present each of the character segments and mark wrong words in the corresponding character segment in a form of preset mark according to the character locations of the wrong words in each of the character segments.

In particular, the apparatus for spell checking can also include:

a presenting instruction receiving module for receiving an instruction for presenting suggested words sent by the client, wherein, range of a character segment to be corrected is carried in the instruction for presenting suggested words;

a wrong word determining module for determining wrong words in the character segment to be corrected according to the range of the character segment to be corrected;

a suggested word obtaining module for obtaining suggested words corresponding to the wrong words in the character segment to be corrected; and a suggested word sending module for sending the obtained suggested words to the client such that the client is able to present the obtained suggested words.

In particular, the apparatus for spell checking can also include:

a check instruction receiving module for receiving an instruction for checking a modified character segment, wherein, the range of the modified character segment is carried in the instruction for checking;

the character location obtaining module is further used for obtaining character locations of wrong words in the modified character segment;

the character location sending module is further used for sending the character locations of the wrong words in the modified character segment to the client such that the client is able to mark the wrong words in the form of the preset mark according to the character locations of the wrong words in the modified character segment.

It can be seen from the above that in the solution provided by the present embodiment, after character segments corresponding to a page to be displayed are obtained by a server, the character locations of wrong words in each of character segments is obtained based on the unit of a character segment and sent to a client. In this way it is possible not only to release the work load of a client, but also to shorten the time taken by spell checking during the loading of a document as compared to that spell checking is carried out for the whole document in the prior art. Thus, it is also possible to improve document loading speed and further document displaying speed, thereby improving users' experience.

It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices comprising a series of elements not only comprise those elements listed, but also comprise other elements not specifically listed or the elements intrinsic to these processes, methods, articles, or devices. Without further limitations, elements limited by the wording "comprise(s) a/an . . . " do not exclude that there are additional identical elements in the processes, methods, articles, or devices, which comprise the listed elements.

As used herein, the singular forms "a", "an" and "the" are intended to include the plural forms as well, unless the context clearly indicates otherwise. Furthermore, although some of elements of the invention may be described or claimed in the plural, the singular is contemplated unless limitation to the plural is explicitly stated. For example, the number of wrong words in a character segment, words corresponding to the target character segment, the filtered words, suggested words, target suggested words, etc. described above, can be one or more, to which the present application is not limited.

It will be understood by one of ordinary skills in the art that all or part of the steps in the embodiments which implement the method described above can be implemented by instructing the related hardware with programs, which programs can be stored in a computer readable storage medium such as ROM/RAM, magnetic disk, optical disk.

The embodiments described above are just preferable embodiments of the present application, and are not indented to limit the protection scope of the present application. Any modifications, alternatives, improvements or the like within the spirit and principle of the present application are included in the protection scope of the present application.

What is claimed is:

1. A method for spell checking on a page when loading and presenting the page, which is applied to a client of a user, characterized in that the method comprises:
   in response to the user using the client to display the page, determining whether the page is being displayed to the user for the first time;
   in response to determining that the page is being displayed to the user for the first time, performing the following operations:
      determining character segments corresponding to characters contained in the page, according to a preset character segment dividing rule;
      performing word segmentation on each of the determined character segments and obtaining words corresponding to each of the determined character segments, performing the spell checking on the words corresponding to each of the determined character segments according to a preset spell checking rule, determining wrong words in each of the determined character segments, and obtaining character locations of the wrong words in each of the determined character segments;
      caching the obtained character locations of the wrong words in each of the determined character segments;
   in response to determining that the page has been previously displayed to the user, performing the following operations:
      obtaining character locations of the wrong words in each of the determined character segments from character locations cached when the page was displayed by the user for the first time; and
      presenting, by the client to the user, each of the determined character segments and marking, according to the character locations of the wrong words in each of the determined character segments, the wrong words in each of the determined character segments,
   wherein the preset character segment dividing rule includes at least one of the following operations:
      determining all characters contained in the page as one character segment;
      in presenting the page, determining characters contained in a line of the page as one character segment;
      dividing characters contained in the page into character segments according to a preset character length; and
      after a character segment corresponding to characters contained in the page is obtained according to a preset character length, determining whether the character at the end of this character segment constitutes a word together with several characters at the beginning of the next character segment, and adjusting the obtained character segment according to the checking result;
   wherein characters contained in the page are obtained from a text stream system, and the text stream system is a system consisting of mapping rules and data pools.

2. The method according to claim 1, characterized in that the step of performing the spell checking on the words corresponding to each of the determined character segments according to a preset spell checking rule, determining wrong words in each of the determined character segments, and obtaining character locations of the wrong words in each of the determined character segments comprises:
   performing the spell checking on the words corresponding to each of the determined character segments according to a preset word library and obtaining wrong words in each of the determined character segments; and
   determining character locations of wrong words in the wrong words of each of the determined character segments for which the spell checking is not ignorable as the character locations of the wrong words in each of the determined character segments.

3. The method according to claim 1, characterized in that the step of obtaining character locations of wrong words in each of the determined character segments from character locations cached when the page was displayed to the user for the first time comprises:
   obtaining wrong words in each of the determined character segments according to information on each of the determined character segments in the cached character locations; and
   determining character locations of wrong words in the wrong words of each of the determined character segments for which the spell checking is not ignorable as the character locations of the wrong words in each of the determined character segments.

4. The method according to claim 1, characterized in that the step of performing the word segmentation on each of the determined character segments and obtaining words corresponding to each of the determined character segments comprises:
   performing the word segmentation on each of the determined character segments;
   filtering the segmented words according to a preset word filtering rule; and
   obtaining the words corresponding to each of the determined character segments according to the filtered words.

5. The method according to claim 1, characterized in that the method further comprises:
   receiving an instruction for presenting suggested words, wherein a range of a character segment to be corrected is carried in the instruction for presenting suggested words;
   determining wrong words in the character segment to be corrected according to the range of the character segment to be corrected;
   obtaining suggested words corresponding to the wrong words in the character segment to be corrected; and
   presenting the obtained suggested words.

6. The method according to claim 5, characterized in that the step of determining wrong words in the character segment to be corrected according to the range of the character segment to be corrected comprises:

matching the range of the character segment to be corrected with the cached character locations; and determining wrong words in the character segment to be corrected according to the result of the matching.

7. The method according to claim 5, characterized in that after obtaining suggested words corresponding to the wrong words in the character segment to be corrected, the method further comprises:

caching character locations of the wrong words in the character segment to be corrected and the suggested words corresponding to the wrong words in the character segment to be corrected.

8. The method according to claim 7, characterized in that the step of obtaining suggested words corresponding to the wrong words in the character segment to be corrected comprises:

determining whether the suggested words corresponding to the wrong words in the character segment to be corrected has been cached, according to the character locations of the wrong words in the character segment to be corrected;

if so, obtaining the suggested words corresponding to the wrong words in the character segment to be corrected from the cached suggested words corresponding to the wrong words; and otherwise, obtaining the suggested words corresponding to the wrong words in the character segment to be corrected according to a preset word library.

9. The method according to claim 5, characterized in that after determining wrong words in the character segment to be corrected according to the range of the character segment to be corrected, the method further comprises:

determining whether the length of the wrong words in the character segment to be corrected is within a preset range; and if so, performing the step of obtaining suggested words corresponding to the wrong words in a character segments to be corrected.

10. The method according to claim 5, characterized in that the method further comprises:

receiving an instruction for selecting suggested words, wherein target suggested words are carried in the instruction for selecting suggested words; and replacing original words corresponding to the target suggested words with the target suggested words and presenting the target suggested words.

11. The method according to claim 1, characterized in that the method further comprises:

obtaining a range of a modified character segment;

obtaining character locations of wrong words in the modified character segment;

marking the wrong words in the modified character segment in a form of a preset mark and updating the cached character locations of the wrong words according to the range of the modified character segment and the character locations of the wrong words in the modified character segment.

12. The method according to claim 1, characterized in that the step of obtaining character locations of wrong words in each of the determined character segments comprises:

determining whether the spell checking has been performed on each of the determined character segments, wherein determining the spell checking has not been performed on each of the determined character segments in response to determining that the page to be presented is being displayed for the first time, and determining the spell checking has been performed on each of the determined character segments in response to determining that the page to be presented was previously displayed.

13. A method for spell checking on a page when loading and presenting the page by a client of a user, which is applied to a server, characterized in that the method comprises:

receiving character segments corresponding to characters contained in the page to be presented at the client, wherein the character segments are determined by dividing the page according to a preset character segment dividing rule by the client;

determining whether the page is being displayed to the user for the first time;

in response to determining that the page is being displayed to the user for the first time, performing the following operations:

obtaining character locations of wrong words in each of the received character segments;

performing word segmentation on the received character segments and obtaining words corresponding to the received character segments, performing the spell checking on the words corresponding to the received character segments according to a preset spell checking rule, determining wrong words in the received character segments and obtaining character locations of the wrong words in the received character segments;

caching the obtained character locations of the wrong words in each of the received character segments;

in response to determining that the page was previously displayed to the user, performing the following operations:

obtaining character locations of wrong words in each of the received character segments from the character locations cached when the page was displayed to the user for the first time; and sending the character locations of the wrong words in each of the received character segments to the client such that the client presents, to the user, each of the received character segments and mark wrong words in each of the received character segments according to the character locations of the wrong words in each of the received character segments, wherein the preset character segment dividing rule includes at least one of the following operations:

determining all characters contained in the page as one character segment;

in presenting the page, determining characters contained in a line of the page as one character segment;

dividing characters contained in the page into character segments according to a preset character length; and after a character segment corresponding to characters contained in the page is obtained according to a preset character length, determining whether the character at the end of this character segment constitutes a word together with several characters at the beginning of the next character segment, and adjusting the obtained character segment according to the checking result, wherein characters contained in the page are obtained from a text stream system, and the text stream system is a system consisting of mapping rules and data pools.

14. The method according to claim 13, characterized in that the method further comprises:
receiving an instruction for presenting suggested words sent by the client, wherein a range of a character segment to be corrected is carried in the instruction for presenting suggested words;
determining wrong words in the character segment to be corrected according to the range of the character segment to be corrected;
obtaining suggested words corresponding to the wrong words in the character segment to be corrected; and
sending the obtained suggested words to the client such that the client presents the obtained suggested words.

15. The method according to claim 14, characterized in that the method further comprises:
receiving an instruction for checking a modified character segment, wherein a range of the modified character segment is carried in the instruction for checking;
obtaining character locations of wrong words in the modified character segment; and
sending the character locations of the wrong words in the modified character segment to the client such that the client is able to mark the wrong words in the form of the preset mark according to the character locations of the wrong words in the modified character segment.

16. The method according to claim 13, characterized in that the method further comprises:
receiving an instruction for checking a modified character segment, wherein a range of the modified character segment is carried in the instruction for checking;
obtaining character locations of wrong words in the modified character segment; and
sending the character locations of the wrong words in the modified character segment to the client such that the client is able to mark the wrong words in the form of the preset mark according to the character locations of the wrong words in the modified character segment.

17. The method according to claim 13, characterized in that the step of obtaining character locations of wrong words in each of the determined character segments comprises:
determining whether the spell checking has been performed on each of the determined character segments,
wherein the spell checking is determined to have not been performed on each of the determined character segments in response to determining that the page to be presented is being displayed for the first time, and
the spell checking is determined to have been performed on each of the determined character segments in response to determining that the page to be presented was previously displayed.

18. An apparatus for spell checking on a page when loading and presenting the page, which is applied to a client of a user, characterized in that the apparatus comprises:
a character segment determining module for determining character segments corresponding to characters contained in the page according to a preset character segment dividing rule;
a character location obtaining module for obtaining character locations of wrong words in each of the determined character segments;
a character location caching module for caching the character locations of the wrong words in each of the determined character segments after the character location obtaining module obtains the character locations; and
a wrong word marking module for presenting, to the user, each of the determined character segments and marking, according to the character locations of the wrong words in each of the determined character segments, the wrong words in each of the determined character segments,
wherein the character location obtaining module comprises:
a character segment determining submodule for determining whether the page is being displayed to the user for the first time in response to displaying the page by the client;
a word obtaining submodule for performing word segmentation on each of the determined character segments and obtaining words corresponding to each of the determined character segments in response to determining that the page is being displayed to the user for the first time;
a first character location obtaining submodule for performing the spell checking on the words corresponding to each of the determined character segments according to a preset spell checking rule, determining wrong words in each of the determined character segments, and obtaining character locations of the wrong words in each of the determined character segments; and
a second character location obtaining submodule for obtaining character locations of the wrong words in the determined character segments from character locations cached when the page was displayed to the user for the first time in response to determining that the page was previously displayed to the user,
wherein the preset character segment dividing rule includes at least one of the following operations:
determining all characters contained in the page as one character segment;
in presenting the page, determining characters contained in a line of the page as one character segment;
dividing characters contained in the page into character segments according to a preset character length; and
after a character segment corresponding to characters contained in the page is obtained according to a preset character length, determining whether the character at the end of this character segment constitutes a word together with several characters at the beginning of the next character segment, and adjusting the obtained character segment according to the checking result; and
wherein characters contained in the page are obtained from a text stream system, and the text stream system is a system consisting of mapping rules and data pools.

19. The apparatus according to claim 18, characterized in that the first character location obtaining submodule comprises:
a first wrong word obtaining unit for performing the spell checking on the words corresponding to each of the determined character segments according to a preset word library and obtaining wrong words in each of the determined character segments; and
a first character location determining unit for determining character locations of wrong words in the wrong words of each of the determined character segments for which the spell checking is not ignorable as the character locations of the wrong words in the target character segment.

20. The apparatus according to claim 18, characterized in that the second character location obtaining submodule comprises:

a second wrong word obtaining unit for obtaining the wrong words in each of the determined character segments according to information on each of the determined character segments in the cached character locations; and a second character location determining unit for determining character locations of wrong words in the wrong words of each of the determined character segments for which the spell checking is not ignorable as the character locations of the wrong words in each of the determined character segments.

21. The apparatus according to claim 18, characterized in that the word obtaining submodule comprises:

a word segmentation unit for performing the word segmentation on each of the determined character segments;

a filtering unit for filtering the segmented words according to a preset word filtering rule; and a word obtaining unit for obtaining the words corresponding to each of the determined character segments according to the filtered words.

22. The apparatus according to claim 18, characterized in that the apparatus further comprises:

a presenting instruction receiving module for receiving an instruction for presenting suggested words, wherein range of a character segment to be corrected is carried in the instruction for presenting suggested words;

a wrong word determining module for determining wrong words in the character segment to be corrected according to the range of the character segment to be corrected;

a suggested word obtaining module for obtaining suggested words corresponding to the wrong words in the character segment to be corrected; and a suggested word presenting module for presenting the obtained suggested words.

23. The apparatus according to claim 22, characterized in that the wrong word determining module comprises:

a range matching submodule for matching the range of the character segment to be corrected with the cached character locations; and a wrong word determining submodule for determining the wrong words in the character segment to be corrected according to the result of the matching.

24. The apparatus according to claim 22, characterized in that the apparatus further comprises:

a suggested word caching module for caching character locations of the wrong words in the character segment to be corrected and the suggested words corresponding to the wrong words in the character segment to be corrected after the suggested word obtaining module obtains the suggested words.

25. The apparatus according to claim 24, characterized in that the suggested word obtaining module comprises:

a suggested word determining submodule for determining whether the suggested words corresponding to the wrong words in the character segment to be corrected have been cached according to the character locations of the wrong words in the character segment to be corrected;

a first suggested word obtaining submodule for obtaining the suggested words corresponding to the wrong words in the character segment to be corrected from the cached suggested words corresponding to the wrong words in case that the determining result from the suggested word determining submodule is positive; and a second suggested word obtaining submodule for obtaining the suggested words corresponding to the wrong words in the character segment to be corrected according to a preset word library in case that the determining result from the suggested word determining submodule is negative.

26. The apparatus according to claim 22, characterized in that the apparatus further comprises:

a length determining module for determining whether the length of the wrong words in the character segment to be corrected is within a preset range, and if so, triggering the suggested word obtaining module to obtain the suggested words.

27. The apparatus according to claim 22, characterized in that the apparatus further comprises:

a selection instruction receiving module for receiving an instruction for selecting suggested words, wherein target suggested words are carried in the instruction for selecting suggested words; and a word replacing module for replacing original words corresponding to the target suggested words with the target suggested words and presenting the target suggested words.

28. The apparatus according to claim 18, characterized in that the apparatus further comprises:

a range obtaining module for obtaining a range of a modified character segment;

the character location obtaining module is further used for obtaining character locations of wrong words in the modified character segment; and the wrong word marking module is further used for marking the wrong words in the modified character segment in a form of preset mark and updating the cached character locations of the wrong words according to the range of the modified character segment and the character locations of the wrong words in the modified character segment.

29. The apparatus according to claim 18, characterized in that the character segment determining submodule determining the spell checking has not been performed on each of the determined character segments in response to determining that the page to be presented is being displayed for the first time, and the character segment determining submodule determining the spell checking has been performed on each of the determined character segments in response to determining that the page to be presented was previously displayed.

30. An apparatus for spell checking on a page when loading and presenting the page by a client of a user, which is applied to a server, characterized in that the spell checking is performed on the server, and the apparatus comprises:

a character segment receiving module for receiving character segments corresponding to characters contained in the page to be presented at the client, wherein the character segments are determined by dividing the page according to a preset character segment dividing rule by the client;

a character location obtaining module for obtaining character locations of wrong words in each of the received character segments;

a character location caching module for caching the character locations of the wrong words in each of the received character segments after the character location obtaining module obtains the character locations; and a character location sending module for sending the character locations of the wrong words in each of the received character segments to the client such that the client is able to present, to the user, each of the character segments and mark wrong words in each of the determined character segments according to the character locations of the wrong words in each of the received character segments, wherein the character location obtaining module comprises:

a character segment determining submodule for determining whether the page is being displayed to the user for the first time;

a word obtaining submodule for performing word segmentation on the received character segments and obtaining words corresponding to the received character segments in response to determining that the page is being displayed to the user for the first time;

a first character location obtaining submodule for performing the spell checking on the words corresponding to the received character segments according to a preset spell checking rule, determining wrong words in the received character segments, and obtaining character locations of the wrong words in the received character segments;

a second character location obtaining submodule for obtaining character locations of wrong words in the received character segments from the character locations cached when the page was displayed to the user for the first time in response to determining that the page was previously displayed to the user, and wherein the preset character segment dividing rule includes at least one of the following operations:

determining all characters contained in the page as one character segment;

in presenting the page, determining characters contained in a line of the page as one character segment;

dividing characters contained in the page into character segments according to a preset character length; and after a character segment corresponding to characters contained in the page is obtained according to a preset character length, determining whether the character at the end of this character segment constitutes a word together with several characters at the beginning of the next character segment, and adjusting the obtained character segment according to the checking result;

wherein characters contained in the page are obtained from a text stream system, and the text stream system is a system consisting of mapping rules and data pools.

31. The apparatus according to claim 30, characterized in that the apparatus further comprises:

a presenting instruction receiving module for receiving an instruction for presenting suggested words sent by the client, wherein a range of a character segment to be corrected is carried in the instruction for presenting suggested words;

a wrong word determining module for determining wrong words in the character segment to be corrected according to the range of the character segment to be corrected;

a suggested word obtaining module for obtaining suggested words corresponding to the wrong words in the character segment to be corrected; and a suggested word sending module for sending the obtained suggested words to the client such that the client is able to present the obtained suggested words.

32. The apparatus according to claim 31, characterized in that the apparatus further comprises:

a check instruction receiving module for receiving an instruction for checking a modified character segment, wherein the range of the modified character segment is carried in the instruction for checking;

the character location obtaining module is further used for obtaining character locations of wrong words in the modified character segment; and the character location sending module is further used for sending the character locations of the wrong words in the modified character segment to the client such that the client is able to mark the wrong words in the form of the preset mark according to the character locations of the wrong words in the modified character segment.

33. The apparatus according to claim 30, characterized in that the apparatus further comprises:

a check instruction receiving module for receiving an instruction for checking a modified character segment, wherein a range of the modified character segment is carried in the instruction for checking;

the character location obtaining module is further used for obtaining character locations of wrong words in the modified character segment; and the character location sending module is further used for sending the character locations of the wrong words in the modified character segment to the client such that the client is able to mark the wrong words in the form of the preset mark according to the character locations of the wrong words in the modified character segment.

34. The apparatus according to claim 30, characterized in that the character segment determining submodule determining the spell checking has not been performed on each of the determined character segments in response to determining that the page to be presented is being displayed for the first time, and the character segment determining submodule determining the spell checking has been performed on each of the determined character segments in response to determining that the page to be presented was previously displayed.

* * * * *

UNITED STATES PATENT AND TRADEMARK OFFICE
CERTIFICATE OF CORRECTION

Page 1 of 1

PATENT NO. : 10,769,370 B2
APPLICATION NO. : 15/132865
DATED : September 8, 2020
INVENTOR(S) : Junhang Zhu and Shicong Yan It is certified that error appears in the above-identified patent and that said Letters Patent is hereby corrected as shown below:

On the Title Page

--(73) Assignee: Beijing Kingsoft Office Software, Inc., Beijing (CN)--
Should read:
--(73) Assignee: Zhuhai Kingsoft Office Software Co., Ltd., Guangdong (CN)
                Beijing Kingsoft Office Software, Inc., Beijing (CN)--

Signed and Sealed this
First Day of June, 2021

Drew Hirshfeld
*Performing the Functions and Duties of the*
*Under Secretary of Commerce for Intellectual Property and*
*Director of the United States Patent and Trademark Office*